ROBERT L. MILLS
JOSEPH ZEMANEK JR.
INVENTORS

BY
ATTORNEY

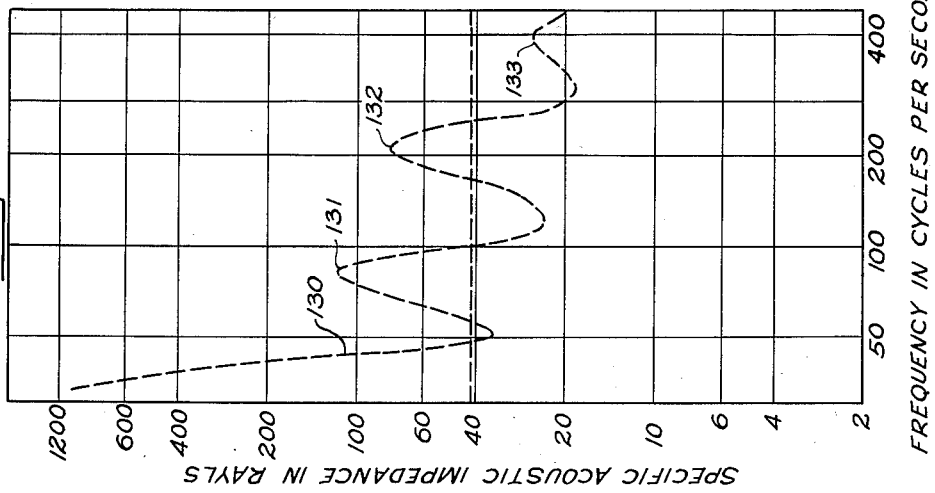
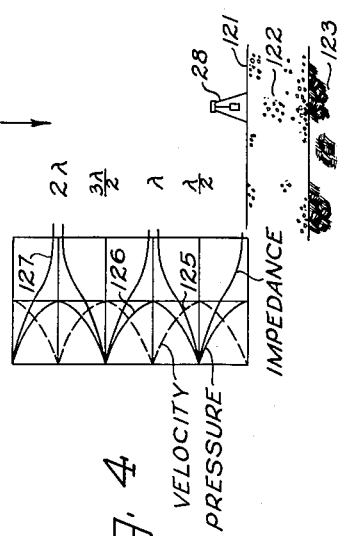
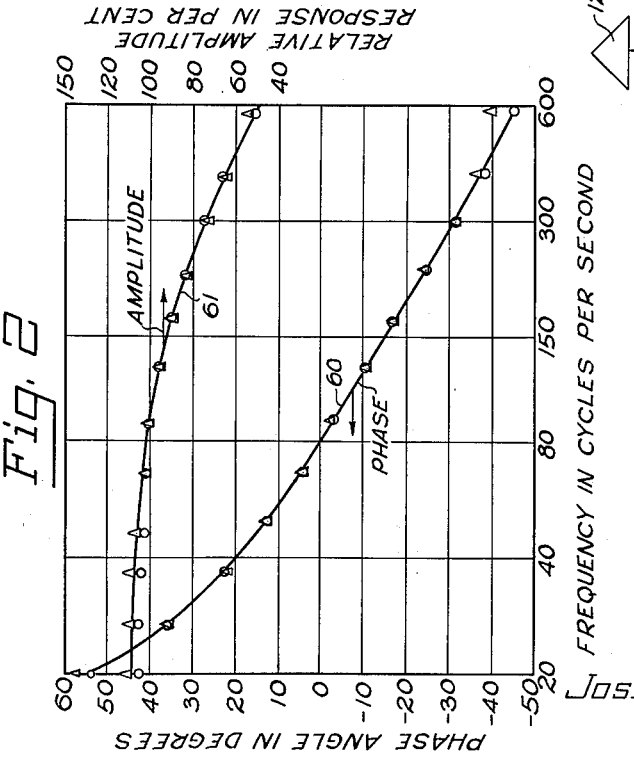
Robert L. Mills
Joseph Zemanek Jr.
INVENTORS
BY *D. Carl Richards*
ATTORNEY

United States Patent Office 2,998,091
Patented Aug. 29, 1961

2,998,091
LOW FREQUENCY MEASUREMENTS OF SPECIFIC IMPEDANCE
Robert L. Mills and Joseph Zemanek, Jr., Dallas, Tex., assignors, by mesne assignments, to Socony Mobil Oil Company, Inc., New York, N.Y., a corporation of New York
Filed Mar. 3, 1958, Ser. No. 718,916
18 Claims. (Cl. 181—.5)

This invention relates to the measurement of the impedance of a first transmitting medium at a selected point in the medium and of the characteristic impedance of a second medium adjacent to the first medium. In a further aspect, the invention relates to the determination of thickness of formations disposed below the floor of a fluid-covered area.

This application is a continuation-in-part of application Serial No. 498,792, filed April 4, 1955, now abandoned.

Specific acoustic impedance of a sound transmitting medium has been measured where such measurements in general have involved the use of a plurality of detecting stations located at different points in an area. This has been necessary in view of limitations encountered in making measurements at a single point. However, such limitations heretofore encountered may be overcome where the wavelength of sound employed is large compared to the dimensions of the detecting system. In general, the wavelength of sound in water is about four times the wavelength of sound in air. The distortion of a sound field by a detector of given size in a marine environment is diminished in proportion to the ratio of the foregoing wavelengths. The present invention therefore relates to measurement of specific impedance of a transmitting fluid for example at any point in the fluid and more particularly, the specific acoustic impedance as well as the characteristic impedance of a solid medium such as a formation underlying a fluid sound transmitting medium. The invention will be described primarily in connection with measurements of specific acoustic impedance.

The provision of a system including a detecting unit capable of measuring acoustic velocity and pressure at low frequencies and substantially at the same point in a sound transmission system has been found to permit accurate measurements of the acoustic impedance.

In accordance with the present invention, there is provided a method and system for measuring earth impedance at an interface which includes the application of a periodic wave to the earth at the said interface to produce forced particle oscillation in the earth. A first function is then generated proportional in magnitude to the applied wave and has the form of the applied wave. A second function is generated which is proportional in magnitude to the magnitude of particle oscillation and has the form of such oscillation. Each of the functions is then separately multiplied by a sine wave function of the frequency of the periodic wave while the phase angle between the first and second functions and the sine wave function is varied. The ratio of the magnitudes of the products thus produced, when at maximum value, is equal to the absolute value of the specific impedance. The phase angle between the points at which said maximum values occur corresponds with the phase angle of said specific impedance.

In accordance with a further aspect of the present invention, there is provided a method and system for measuring the acoustic impedance at a reflecting interface which includes directing a periodic acoustic wave toward the interface and detecting at a point adjacent to the interface the particle velocity perpendicular to the interface and the pressure variations adjacent to the interface. The pressure dependent function is then modified complementarily to the distortion both in phase and amplitude of the particle velocity function by the detection thereof. The modified pressure dependent function and the particle velocity function are then separately multiplied by a sine wave function having a frequency corresponding to a component of the periodic acoustic wave and having an adjustable phase relative to the acoustic wave. As the phase of the sine wave function changes, the values of the products vary. The ratio of the maximum amplitudes of the products is proportional to the absolute magnitude of the specific acoustic impedance and the difference between the phase angles at which the maxima (or, if preferred, between voltage nulls) occur is the phase angle of the specific acoustic impedance.

In a more specific aspect, there is provided a pressure sensitive detector and a particle velocity detector resiliently supported adjacent to an interface and adapted to produce two functions respectively proportional to instantaneous pressure and to a particle velocity at a point in a sound transmitting medium. A compensating network corresponding electrically to the equivalent electrical circuit of the velocity detector is connected to the pressure detector. A multiplier having a sine wave function applied to one input is selectively connectable at the other input to the output of the velocity detector or to the output of the compensating network. The phase angle between the oscillatory function relative to the acoustic wave is continuously variable whereby the multiplier output may be made to pass through a maximum and, if desired, a voltage null for both the velocity and pressure functions. By this means there is provided a measurement of the amplitude of acoustic impedance and a direct measurement of the phase angle of the acoustic impedance.

In a further aspect the present invention provides a method of measuring bedding thickness by measuring the specific acoustic impedance at each of a plurality of frequencies and measuring the difference between frequencies of maxima in the specific acoustic impedance frequency characteristic curve.

For a more complete understanding of the present invention and for further objects and advantages thereof, reference may now be had to the following description taken in conjunction with the accompanying drawings in which:

FIG. 2 is a plot of phase and amplitude characteristics of the velocity detector;

FIG. 3 is a plot of specific acoustic impedance as a function of frequency in a medium showing the presence of a buried reflecting interface;

FIG. 4 illustrates the geometry of the system corresponding to FIG. 3 along with a related graph.

Figure 1:
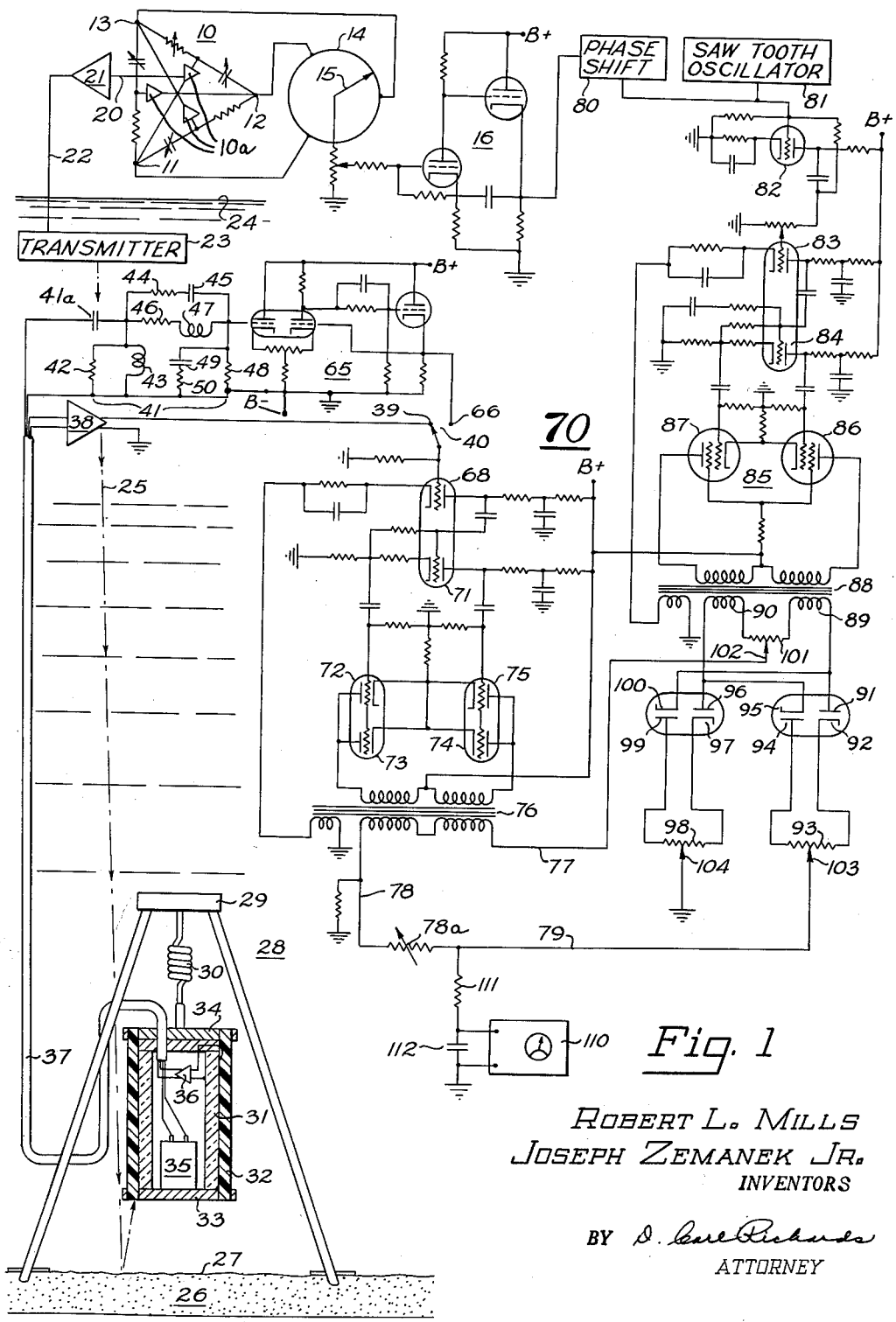
FIG. 1 is a circuit diagram of a system for carrying out the present invention some parts of which are shown in section and submerged under water and other portions thereof being shown in schematic diagram.

In FIG. 1 a system for carrying out the present invention has been illustrated as including a three phase oscillator 10 capable of producing at output terminals 11, 12 and 13 three voltages common in frequency but separated in phase by $$\frac{2\pi}{3}$$

radians. Terminals 11, 12 and 13 are connected to points uniformly spaced along the periphery of a continuous potentiometer 14. The variable tap 15 of potentiometer 14 when moved through its range provides at the input of a buffer amplifier stage 16 a voltage constant in amplitude with respect to ground and which varies in phase through $2\pi$ radians. The oscillator 10 may be one of several different specific circuits but preferably is of the type described in detail in application Serial No. 452,617, filed August 27, 1954, by Goethe M. Groenendyke, a co-worker of applicants, now Patent No. 2,791,694, issued May 7, 1957, in which ground connections are provided in the amplifiers 10a.

One phase from oscillator 10 is connected by way of channel 20 to a power amplifier 21 whose output in turn is connected by way of channel 22 to an acoustic transmitter 23 positioned at a point below the surface 24 of a water body. Thus energized, transmitter 23 produces a sustained oscillatory acoustic wave which travels downwardly as by way of path 25 to the bottom of the water body formed by a mud layer 26. At the interface 27 between the water and mud the oscillatory wave is reflected back towards the surface. A detector system 28 is positioned adjacent the interface 27. A tripod structure 29 supports a pair of acoustic detectors by a spring 30. The first acoustic detector comprises a piezo-electric cylinder 31 which is supported in a resilient but waterproof housing formed by a rubber tube 32 having metallic end closure members 33 and 34. Tube 32 may conveniently be clamped to end closure members to form a fluid-tight seal by ring clamps (not shown). The lower closure member 33 supports a velocity detector 35 which produces a signal proportional to the component of particle velocity parallel to the axis of the cylinder 31. A preamplifier 36 is also housed within cylinder 31 and serves to amplify pressure signals produced by cylindrical crystal 31 for transmission over a first signal channel in a cable 37 to surface measuring equipment. The velocity dependent output of detector 35 is transmitted over a second signal channel in cable 37 to the surface.

At the surface the velocity dependent signal is applied to an amplifier 38 whose output in turn is connected to one terminal 39 of a selector switch 40. In order that a comparison between the pressure signal from detector 31 and the velocity signal from detector 35 may be equivalent to comparing actual sound pressure and particle velocity at the location of the detecting system, the signals must have the same relationship to each other as the pressure and velocity. The output of detector 31 is instantaneously proportional to pressure but because of the electromechanical character of geophones generally, the output of the velocity detector is not instantaneously proportional to particle velocity.

The character of either the pressure signal or the velocity may be compensated for the effects of the electromechanical character of the geophone. In FIG. 1 the network 41, which has a transfer characteristic proportional in phase and amplitude to the difference between the relationship of the pressure signal and the velocity signal to each other, is connected in circuit with the pressure detector to compensate the pressure signal.

The circuit 41 includes a condenser 41a and a shunt network comprising resistor 42 and inductance 43 connected between condenser 41a and ground. A series network includes resistor 44 and condenser 45 connected in series as a first arm which arm is connected in parallel with a second arm which comprises resistor 46 and inductance 47. A second shunt arm connected to ground includes resistor 48 connected in parallel with condenser 49 and resistor 50.

FIG. 2 illustrates the transducer characteristic of network 41 which at the same time is representative of the relationship between particle velocity at the location of detector system 28 and the signal voltage from velocity detector 35.

It will be seen that over a frequency range of from 20 to 600 cycles per second a marked phase distortion is introduced by detector 35. The variations in phase as a function of frequency are represented by curve 60. Further, it will be noted that the amplitude response falls off at the higher frequencies as illustrated by the amplitude curve 61. As is well understood by those skilled in the art, a passive network may be designed to simulate the action of the velocity detector. In FIG. 2 the points indicated by circles represent data obtained from a network such as network 41. The points represented by triangles represent data taken from geophone 35. With such a match between the mechanical transfer characteristic of geophone 35 and electrical transfer characteristic of network 41, the pressure signal passing through amplifying network 65 and appearing at the second switch terminal 66 may be compared with the velocity signal at terminal 39 with assurance that they represent similar functions. The arm of switch 40 is connected to the input grid of an amplifier tube 68 which forms the input stage of a first amplifying channel of an electronic multiplier 70.

The first amplifying channel includes an inverter stage 71 and a push-pull, parallel connected, triode output stage including triodes 72, 73, 74 and 75. The output stage is then coupled through an output transformer 76 and further by way of conductors 77 and 78 into the output circuit of the second multiplier channel.

The second multiplier channel is connected at its input to a phase shifting circuit 80 which need not be calibrated and which transmits a signal from the oscillator output impedance 14 to the multiplier. The input of the second multiplier channel is also connected to the output of a saw-tooth oscillator 81. Thus there is applied to the grid of tube 82 a signal which is the sum of a sine wave voltage from oscillator 10 and a saw-tooth voltage from oscillator 81. The combined voltages are then transmitted through an amplifying stage 83 and a phase inverting stage 84 to a power amplifier 85 which includes power tetrodes 86 and 87.

The output from amplifier 85 energizes an output transformer 88 which has two secondary windings 89 and 90. One terminal of winding 89 is connected to the anode 91 of a diode whose cathode 92 is connected by way of a potentiometer 93 to the anode 94 of a second diode. The cathode 95 of the second diode is connected to the anode 96 of a third diode whose cathode 97 is connected by way of potentiometer 98 to the anode 99 of a fourth diode. The cathode 100 of the fourth diode is connected to the anode 91 of the first diode. The anode 96 of the third diode is connected to a first terminal of transformer winding 90. A potentiometer 101 interconnects the second terminals of transformer windings 89 and 90.

Conductor 77 leading from the first amplifying channel is connected to the tap 102 of potentiometer 101 and conductor 78 is connected by way of variable resistor 78a to the tap 103 of potentiometer 93. A variable tap 104 on potentiometer 98 is connected to ground.

A voltmeter 110 forms the output of the multiplier and more particularly is connected across a condenser 112 connected at one terminal to ground and at the other terminal to a resistor 111. Resistor 111 is connected to conductor 79. Meter 110 measures and indicates the magnitude of the output voltage from multiplier 70.

The operation of the multiplier is such that through the use of the saw-tooth voltage from oscillator 81 the sine wave voltage from oscillator 10 is multiplied by the voltage applied to the grid of tube 68. The requirements of the system are that the saw-tooth oscillator 81 produce an output voltage which in general is large compared to the magnitude of either the sine wave voltage from oscillator 10 or the signal voltage applied to the grid of tube 68. In essence the two functions, the sine wave voltage from oscillator 10 and the signal voltage on tube 68, are mixed with the saw-tooth carrier from oscillator 81, and in the output circuit (including the four output diodes) there is produced the difference between the absolute magnitudes of the sum and the difference of a first function which is the saw-tooth carrier plus the voltage from oscillator 10, and a second function which is the voltage applied to tube 68. Frequency components of the saw-tooth carrier are eliminated from the multiplier output by integration in the combination of resistor 111 and condenser 112. The remainder is applied to the voltmeter 110 and is proportional to the average value of the product of the sine wave voltage from oscillator 10 and the signal voltage on the grid of tube 68.

The voltage measured by meter 110, because of multiplication with a constant amplitude, single frequency oscillator output, is proportional to the component of the detector signal corresponding in frequency with the oscillator output. The frequency of oscillator 10 may then be varied over a frequency spectrum. For each frequency a measurement may be made by meter 110 indicating the magnitude of each component. The ratio of the pressure signal to velocity signal at any given frequency is the specific acoustic impedance of the sound transmitting medium at that frequency.

In operating the system to obtain such a measurement at any given frequency, the following steps are followed. Oscillator 10 is energized to produce from transmitter 23 a continuous or oscillatory acoustic function which is detected by the detecting system 28 located closely adjacent interface 27. The particle velocity signal is applied to terminal 39 and a compensated pressure signal is applied to terminal 66 of switch 40. With the arm of switch 40 first connected to terminal 39, the particle velocity signal is multiplied by the continuous sine wave function from oscillator 10 as applied through phase shift circuit 80. Phase shift circuit 80 is then adjusted so that the reading on voltmeter 110 is a maximum. The magnitude of the latter voltage is then noted. The arm of switch 40 is then connected to terminal 66. With phase shift circuit 80 maintained fixed, the variable tap on potentiometer 14 is adjusted so that a second maximum voltage is obtained on voltmeter 110. This second maximum is then noted and the movement of tap 15 also is noted. Since the voltage from potentiometer 14 may be varied over a phase angle of $2\pi$ radians, the movement of tap 15 may be calibrated directly in degrees. The phase angle represented by the movement of the tap 15 between the two maximum readings of voltmeter 110 is the phase angle of the specific acoustic impedance of the point at which detector 28 is positioned and for the frequency of oscillator 10. As above noted, the magnitude of the specific acoustic impedance is the ratio of the pressure maximum to the velocity maximum.

The system illustrated in FIG. 1 is representative of multipliers which, in general, may be employed for obtaining the product of either the pressure function or the velocity function from the detector 28 and a selected fundamental. The operation is in effect one of sharply filtering a single frequency component from the output of detector 28 corresponding to the selected fundamental which component is then measured on meter 110. The system thus provided is essentially a frequency analyzer.

While the system above described may be employed to measure specific acoustic impedance generally, it is particularly desirable in that it may be employed to determine to some degree the bedding underlying fluid-covered zones. An example of such measurements is shown in FIGS. 3 and 4. The geometry of the system is shown in FIG. 4 in which a transducer 120 positioned in a fluid medium over a fluid-solid interface 121 at the top of a relatively low velocity layer 122 which in turn overlies a higher velocity layer 123. The detector system 28 of FIG. 1 is immediately above the interface 121. The graph of FIG. 4 illustrates by the dotted curve 125 variations in particle velocity at a given frequency at points along a line normal to interface 121. Similarly, curve 126 illustrates variations in pressure. The curve 127 which is the ratio of pressure to velocity effectively is a plot of acoustic impedance.

By making measurements with detector system 28 stationary and varying the frequency of sound from source 120, the points corresponding to those of the graph of FIG. 4 effectively are moved past the detecting system so that variations in the specific acoustic impedance may be determined. Such variations are shown in FIG. 3 in which the curve 130 represents the specific acoustic impedance as measured by detector 28, FIG. 4. It is to be noted that a first peak 131 occurs at about 80 cycles, a second peak 132 at about 240 cycles and a third peak 133 at about 400 cycles. This would indicate that layer 122 has a thickness of a quarter wave length of sound at about 80 cycles per second. The difference in the frequency at which two adjacent maximums occur is proportional to the thickness of the bed. A knowledge of the velocity of sound in the formation 122 would then permit calculation of its thickness. Thus the present invention may be employed to determine bedding characteristics by the effect such bedding has on the character of specific acoustic impedance.

While the measurements herein described principally deal with use of the system as shown in FIG. 1, it will be apparent that other devices may be used for carrying out the measuring steps. For example, the signal from a pressure detector at a given location in a medium could be recorded on film as well understood by those skilled in the art. Thereafter a velocity signal detected at the same point in the medium could be independently recorded on film. Such recordings could be made for each of a plurality of frequencies throughout a spectrum. The ratio of pressure to velocity could then be measured mechanically through the use of scalers or dividers to produce a direct measurement of the magnitude of specific acoustic impedance. Furthermore, automatic multiplying systems such as digital computers could be employed for processing the measured data. It will therefore be apparent that applicants have presented a novel system for carrying out measurements of acoustic impedance which will be found advantageous because of its simplicity and that the method of determining lithology to a limited degree lying below a fluid-covered medium is quite independent of the specific apparatus shown in FIG. 1. In the course of reducing the data to acoustic velocity whether it be through the use of the system shown in FIG. 1 or through manual operations, one of the two signals must be compensated in amplitude and in phase in order that the ratio thereof may be relied upon as representative of impedance. Such compensation may be done manually or automatically as in FIG. 1. If manually, the calibration curve such as shown in FIG. 2 could be employed for adjusting amplitudes and phases of photographically recorded signals.

The operations above described relate to the measurement of specific acoustic impedance by noting two maximum readings of voltmeter 110 upon variations of tap 15 on potentiometer 14. Such peak readings may be relied upon for computing the amplitude of specific acoustic impedance if the potentiometer 14 is so designed as to produce a voltage output whose amplitude is independent of the position of tap 15. Alternatively, for any variations in the position of tap 15 the voltage applied to buffer amplifier 16 may be adjusted to a predetermined or constant value.

An alternative mode of operation is to measure two maximum readings on voltmeter 110 (i.e., when detector 31 and detector 35 are successively connected to multiplier 70) by adjusting only phase shift circuit 80. Phase shift circuit 80 preferably is of the type well known to those skilled in the art as comprising an R-C network in the output of a phase inverter stage. Such a system is illustrated and described in the M.I.T. publication, "Waveforms" (1950), vol. 19, page 136, and provides a constant voltage output at all phase settings. Thereafter the tap 15 of potentiometer 14 may be varied to produce null readings in the output of multiplier 70. The phase angle between null readings obtained when detectors 31 and 35 are successively connected is independent of the amplitude of the signals involved. Thus a more accurate measurement of the phase angle of the specific acoustic impedance is obtained.

Figure 5:
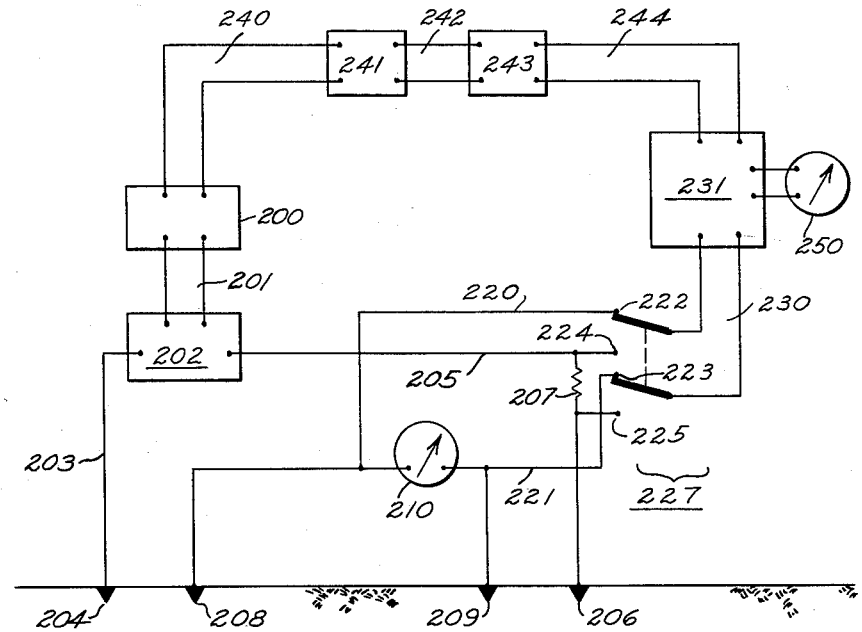
FIG. 5 illustrates a schematic diagram partially in block form of a further modification of the invention.

Referring now to FIG. 5, there is illustrated a system for measuring the specific electrical impedance of the earth. A signal source 200 is connected by way of channel 201 to a transducer 202. Transducer 202 is controlled by source 200 and is adapted to generate a periodic output current of appreciable magnitude for flow through the earth. A first conductor 203 serves to connect a first output terminal of transducer 202 to a current electrode 204. A second conductor 205 serves to connect the second output terminal of transducer 202 to a second current electrode 206. A resistance 207 is connected in the circuit of conductor 205. By this means a periodic wave is produced in the earth by current from transducer 202 which has a frequency component controlled by the signal from generator 200. A periodic wave electrical in form is thus applied to the earth between the electrodes 204 and 206.

The resultant flow of current in the earth is characterized by oscillation of electrons or electrical particles under control of the voltage applied to electrodes 204 and 206. The voltage drop occasioned by such current flow is detected by potential electrodes 208 and 209 and applied to an indicator 210. Electrode 208 is also connected as by way of conductor 220 to a terminal 222 of a two pole, double throw switch 227. Electrode 209 is connected by way of conductor 221 to a switch terminal 223. The upper end of resistor 207 is connected to switch terminal 224. The lower end of resistor 207 is connected to switch terminal 225. The output armatures of switch 227 are connected by way of channel 230 to a first input of a multiplier 231.

Source 200 is connected by way of channel 240 to a phase shifting unit 241 and thence by way of channel 242 to a calibrated phase shifting unit 243. The output circuit of unit 243 is applied by way of channel 244 to a second input of the multiplier 231. With the armatures of double pole, double throw switch 227 in the lower position, a signal is applied to the multiplier 231 representative of the magnitude of the driving force or the periodic electrical wave applied to the earth. The phase shifting unit 241 is then varied until the output of the multiplier as indicated on a suitable meter such as meter 250 is a maximum. Thereafter switch 227 is moved so that the armatures thereof are in contact with the upper terminals 222 and 223. A signal is thus applied to the multiplier which is proportional in magnitude to the current flow or the forced particle oscillation in the earth as appearing between electrodes 208 and 209. The calibrated phase shifting unit 243 is then adjusted so that meter 250 again indicates a maximum value. It will now be apparent that the two maximum readings thus obtained on meter 250 may be employed to determine the absolute value of the specific electrical impedance of the earth at the frequency of the signal from source 200. The magnitude of the said impedance is equal to the ratio of the maximum signal developed on meter 250 from the potential function appearing across electrodes 208 and 209 to the maximum produced from the current function detected across resistor 207. The impedance phase angle is equal to the phase shift found necessary by adjustment of unit 243 in order to produce maximum readings on meter 250.

The absolute value of the impedance thus determined will be dependent upon the geometrical relationship between the electrodes. Where the spacing between current electrodes 204 and 206 is greater than the spacing between potential electrodes 208 and 209, the magnitude of the electrical impedance will be reduced by a factor dependent upon the relative spacing.

While the invention has been described in connection with certain embodiments thereof, it will now be understood that further modifications will suggest themselves to those skilled in the art and it is intended to cover such modifications as fall within the scope of the appended claims.

What is claimed is:

1. A system for measuring earth impedance at an interface which comprises a circuit including means for applying a periodic wave to the earth at said interface to produce forced particle oscillation in said earth, a first detector means for generating a first physical function proportional in magnitude to said wave and having the form thereof, a second detector means for generating a second physical function proportional to the magnitude of a characteristic of said particle oscillation and having the form thereof, a multiplying network having a first input and a second input, means including a sine wave voltage source having the frequency of said periodic wave for connecting said multiplying network to said circuit and adapted to apply a sine wave voltage of the frequency of said periodic wave to a first input of said multiplying network, means in said circuit for selectively connecting a second input of said multiplying network to each of said detector means selectively to apply said first function or said second function to said multiplying network, and means in said circuit for varying the phase angle between said sine wave voltage and each of said first function and second function to produce maximums in the products of said sine wave voltage and the functions whereby the absolute value of said impedance may be obtained from the ratio of said product maximums and the phase angle between said maximums corresponds with the phase angle of said impedance.

2. A system for measuring the acoustic impedance at a reflecting interface which comprises a circuit including means for directing a continuous oscillatory acoustic wave toward said interface, a velocity detector and a pressure detector positioned at substantially the same point near said interface and adapted to produce two output functions dependent upon said oscillatory acoustic wave, a multiplying network in said circuit, means in said circuit for applying a sine wave voltage of the frequency of said acoustic wave to a first input of said multiplier, a compensating network connected to said pressure detector and having phase and amplitude characteristics corresponding to said velocity detector, means for selectively connecting the second input of said multiplier to the output of said velocity detector or the output of said compensating network, and means for varying the phase angle between said sine wave voltage and said acoustic wave over a range to produce a maximum in the product of said sine wave voltage and the outputs from said velocity detector and from said compensating network.

3. A system for measuring specific acoustic impedance of a fluid medium which comprises a circuit including means adapted to produce a continuous oscillatory acoustic signal in the fluid, velocity and pressure detectors positioned at substantially the same location in said field for producing output functions which bear predetermined reltionships to particle velocity and pressure in said fluid, a frequency analyzer in said circuit, signal channels extending between each of said detectors and an input of said analyzer with one of said channels including means having a transfer characteristic proportional in phase and amplitude to the difference between said relationships for compensating a first of said functions, and means in said circuit for selectively connecting said analyzer to said two channels separately to measure the ampltiudes of the frequency components of the second of said two functions and the compensated function corresponding to a selected frequency of said continuous oscillatory function.

4. A system for measuring the acoustic impedance in a fluid medium which comprises a detector system disposed in said medium including a crystal cylinder for producing a pressure dependent signal, a velocity detector positioned inside said cylinder for producing a signal proportional to the component of particle velocity parallel to the axis of said crystal cylinder, a circuit including generating means for producing an acoustic wave of given frequency in said medium, a multiplier connected to said generating means having two inputs with a reference signal from said generating means of said given frequency applied to a first of said inputs, a first signal channel connected to said crystal cylinder and including a compensating network having a transfer characteristic corresponding to the transfer characteristic of said velocity detector, a second signal channel connected to said velocity detector, means for selectively connecting the second input of said multiplier to said first channel or to said second channel, and means in said circuit for varying the phase angle between said reference signal and said acoustic wave to produce maximum readings on the output of said multiplier when connected successively to said first and to said second channels whereby the ratio of said maximum is the amplitude of said specific acoustic impedance and the difference in phase angle between said acoustic wave and the output voltage from said first channel and said second channel respectively is the phase angle of said specific acoustic impedance.

5. A system for measuring the acoustic impedance of a fluid medium which comprises a detector system disposed in said medium including a crystal cylinder for producing a pressure dependent signal, a velocity detector positioned inside said cylinder for producing a signal proportional to the component of particle velocity parallel to the axis of said crystal cylinder, a transmitting transducer positioned in said medium, circuit means including an oscillator connected to said transducer for producing an acoustic wave in said medium, a multiplier in said circuit means having two inputs, a first of which is connected to said oscillator, a first signal channel connected to said crystal cylinder and including a compensating network having a transfer characteristic corresponding to the transfer characteristic of said velocity detector, a second signal channel connected to said velocity detector, means in said circuit means for selectively connecting the second input of said multiplier to said first channel or to said second channel, and means connected in circuit with said oscillator and between said transducer and the first multiplier input for varying the relative phase angles between signals applied thereto and said acoustic wave to produce maximum readings on the output of said multiplier when connected successively to said first signal channel and to said second signal channel whereby the ratio of said maximums is the amplitude of said specific acoustic impedance and the difference between said phase angles is the phase angle of said specific acoustic impedance.

6. A method for determining thickness of a strata adjacent a fluid covered surface which comprises producing in the fluid a continuous oscillatory acoustic signal of a first frequency, at a point in said fluid adjacent said surface generating a velocity function and a pressure function which bear predetermined relationships to particle velocity and pressure at said point, modifying in phase and amplitude a first of the functions in an amount directly proportional to the difference between said relationships, measuring the amplitudes of the components of the modified function and the second of said functions at said first frequency, and repeating the aforesaid steps at each of a plurality of different frequencies to produce two maximums in the ratio of the pressure function to the velocity function at each of said plurality of different frequencies whereby the frequency difference between said two maximums is proportional to said thickness.

7. A method for determining thickness of a strata adjacent a fluid covered surface which comprises producing in the fluid a continuous oscillatory acoustic signal of a first frequency, at a point in said fluid adjacent said surface generating a velocity function and a pressure function which bear predetermined relationships to particle velocity and pressure at said point, modifying in phase and amplitude the pressure function in an amount directly proportional to the difference between said relationships, measuring the amplitudes of the components corresponding in frequency to said acoustic signal of the modified pressure function and the velocity function, and repeating the aforesaid steps at each of a plurality of different frequencies to produce at each of said plurality of different frequencies two maximums in the ratio of the pressure function to the velocity function whereby the frequency difference between said two maximums is proportional to said thickness.

8. A system for measuring acoustic impedance of a fluid medium which comprises an oscillator, a transducer positioned in said fluid medium and connected to said oscillator for producing a continuous oscillatory acoustic signal in said medium, a pressure detector and a particle velocity detector positioned at the same point in the oscillatory sound field produced by said transducer for producing a pressure function and a velocity function, circuit means including a multiplier having two inputs, one of which is selectively connectable to said velocity detector or said pressure detector for response to said velocity function or said pressure function, a signal channel interconnecting said oscillator and the second of said inputs and including a phase shifting means for applying a sinusoidal signal to said second input for multiplication with said pressure function and said velocity function, means in said circuit means for indicating the magnitude of the product from said multiplier, and means in said circuit means for varying the phase angle between said oscillatory sound field and said sinusoidal signal to produce maxima in said product for both said pressure function and said velocity function.

9. The combination set forth in claim 8 in which said phase shifting means comprises a first phase shifting circuit and a calibrated phase shifting circuit whereby the first phase shifting circuit may be actuated to produce a maximum in the product of said sinusoidal signal and one of said functions and said calibrated phase shifting circuit may be employed to vary the phase angle between said sinusoidal signal and the other of said functions for producing a maximum in the product of said sinusoidal signal and the other of said functions thereby to indicate directly by the actuation of said calibrated phase shift circuit the phase angle of the acoustic impedance of said medium.

10. A system for measuring the acoustic impedance in a fluid medium which comprises an acoustic transducer positioned in said medium, a pressure responsive detector and a particle velocity detector positioned in said medium in the sound field from said transducer, circuit means including a three phase oscillator, amplifying means in said circuit means for applying a signal from one phase of said three phase oscillator to said transducer for producing said sound field, a multiplying network in said circuit means having two inputs, a variable phase shift circuit connected to the outputs of said three phase oscillator and to one of the inputs of said multiplying network, a switch in said circuit means for selectively connecting the second of said inputs to said pressure responsive detector or to said particle velocity detector, means in said circuit means for registering the magnitude of the output of said multiplying network, and adjusting means in said circuit means for adjusting the phase angle between the electrical output of said phase shifting circuit and the acoustic output of said transducer through a range to produce a maximum in said output when the multiplying network is connected successively to said pressure detector and to said velocity detector whereby the phase angle between said maximums is the phase angle of the specific acoustic impedance and the ratio of said maximums is the amplitude of said specific acoustic impedance.

11. A system for measuring the acoustic impedance in a fluid medium which comprises an acoustic transducer positioned in said medium, a pressure responsive detector and a particle velocity detector positioned in said medium in the sound field from said transducer, circuit means including a three phase oscillator, amplifying means in said circuit means for applying a signal from one phase of said three phase oscillator to said transducer for producing said sound field a multiplying network in said circuit means having two inputs, a calibrated phase shift circuit connected to the outputs of said three phase oscillator, a phase shift network connected between said output of said phase shift circuit and one of the inputs of said multiplying network, switching means in said circuit means for selectively connecting the second of said inputs to said pressure responsive detector or to said particle velocity detector, and means in said circuit means for registering the magnitude of the output of said multiplying network.

12. A system for measuring acoustic impedance in a fluid medium which comprises an acoustic transmitter in and adjacent the surface of said medium, a circuit including an oscillator connected to said transmitter to produce an acoustic sound field in said medium, a piezoelectric cylinder adjacent the floor of said medium and in said sound field, a velocity sensitive detector supported in said cylinder for movement with said cylinder, a multiplying network in said circuit having two inputs, means in said circuit connected between said oscillator and one of said inputs for applying a sine wave voltage of the same frequency as said sound field thereto, means in said circuit for selectively connecting said cylinder or said velocity detector to the other of said inputs for multiplication with said voltage to produce output voltages, means in said circuit for varying the phase angle of said voltage relative to said acoustic sound field for producing maxima in said output voltages, means in said circuit for measuring the phase separation between said maxima of said output voltages at a given frequency.

13. The combination set forth in claim 12 in which the frequency of said oscillator is variable for measurements at each of a plurality of acoustic frequencies.

14. The combination set forth in claim 12 in which signals from said cylinder pass through a transfer network whose electrical transfer characteristics correspond to the electromechanical transfer characteristics of said velocity sensitive detector.

15. A system for measuring the acoustic impedance in a fluid medium which comprises a transmitting transducer positioned in said medium, a circuit including an oscillator, amplifying means in said circuit for applying a signal from said oscillator to said transmitting transducer for producing a sound field in said medium, a pressure responsive detector and a particle velocity detector positioned in said medium in said sound field, a multiplying network in said circuit having two inputs, a calibrated phase shifting means in said circuit connected to the output of said oscillator and to one of said inputs of said multiplying network, switching means in said circuit for selectively connecting the second of said inputs to said pressure responsive detector or to said particle velocity detector, and means in said circuit for registering the magnitude of the output of said multiplying network when connected successively to said pressure responsive detector and to said particle velocity detector.

16. The combination set forth in claim 15 in which said pressure responsive detector and said particle velocity detector are positioned as to be responsive to pressure and particle velocity at substantially the same point in said medium.

17. The combination set forth in claim 15 in which said pressure responsive detector comprises a hollow piezoelectric cylinder and said particle velocity detector comprises a dynamic geophone supported substantially in and at the axis of said cylinder as to be responsive to pressure and particle velocity at substantially the same point in said medium.

18. The combination set forth in claim 15 in which said pressure responsive detector and said particle velocity detector are positioned from and adjacent an acoustic interface in said medium as to be responsive to pressure and particle velocity at substantially the same point for determining the specific acoustic impedance at said interface.

References Cited in the file of this patent

UNITED STATES PATENTS

| | | |
|---|---|---|
| 2,521,130 | Scherbatskoy | Sept. 5, 1950 |
| 2,608,602 | Muffly | Aug. 26, 1952 |
| 2,711,646 | Mendousse | June 28, 1955 |
| 2,837,914 | Caldwell | June 10, 1958 |